(12) United States Patent
Han et al.

(10) Patent No.: US 10,106,675 B2
(45) Date of Patent: Oct. 23, 2018

(54) RUBBER COMPOSITION, METHOD OF MAKING, AND ARTICLES MADE THEREFROM

(71) Applicant: SABIC Global Technologies B.V., Bergen op Zoom (NL)

(72) Inventors: Seung C. Han, Riyadh (SA); Hamad Abdullah Behaijan, Riyadh (SA); Susanta Mitra, Bangalore (IN)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 15/546,345

(22) PCT Filed: Jan. 25, 2016

(86) PCT No.: PCT/EP2016/051452
§ 371 (c)(1),
(2) Date: Jul. 26, 2017

(87) PCT Pub. No.: WO2016/120211
PCT Pub. Date: Aug. 4, 2016

(65) Prior Publication Data
US 2018/0030249 A1    Feb. 1, 2018

Related U.S. Application Data

(60) Provisional application No. 62/108,698, filed on Jan. 28, 2015.

(51) Int. Cl.
| | | |
|---|---|---|
| *C08L 9/00* | (2006.01) | |
| *C08C 19/20* | (2006.01) | |
| *C08L 9/06* | (2006.01) | |
| *B60C 1/00* | (2006.01) | |
| *C08C 19/06* | (2006.01) | |
| *C08K 3/36* | (2006.01) | |
| *C08K 5/548* | (2006.01) | |
| *C08L 15/00* | (2006.01) | |

(52) U.S. Cl.
CPC ............... *C08L 9/06* (2013.01); *B60C 1/0016* (2013.01); *C08C 19/06* (2013.01); *C08C 19/20* (2013.01); *C08K 3/36* (2013.01); *C08K 5/548* (2013.01); *C08L 9/00* (2013.01); *C08L 15/00* (2013.01)

(58) Field of Classification Search
CPC .................................. C08C 19/20; C08L 9/00
See application file for complete search history.

(56) References Cited

U.S. PATENT DOCUMENTS

| | | | |
|---|---|---|---|
| 6,319,994 B2 | 11/2001 | Scholl et al. | |
| 7,893,153 B2 | 2/2011 | Tanaka et al. | |
| 7,902,278 B2 * | 3/2011 | Hogan | B60C 1/0016 524/106 |
| 8,613,298 B2 | 12/2013 | Kaszas | |
| 8,716,393 B2 | 5/2014 | Zhao | |
| 2002/0045699 A1 | 4/2002 | Scholl et al. | |
| 2011/0021660 A1 | 1/2011 | Steinhauser et al. | |
| 2011/0282001 A1 | 11/2011 | Steinhauser et al. | |
| 2012/0259043 A1 | 10/2012 | Lopitaux et al. | |
| 2015/0353690 A1 | 12/2015 | Kawai | |

FOREIGN PATENT DOCUMENTS

| | | |
|---|---|---|
| CA | 1121099 | 3/1982 |
| EP | 2289712 A1 | 3/2011 |
| JP | 2001172499 A | 6/2001 |
| WO | 2007024797 A2 | 3/2007 |

OTHER PUBLICATIONS

International Search Report for International Application No. PCT/EP2016/051452; International filing date: Jan. 25, 2016; dated Jun. 8, 2016; 6 pages.
International Search Report; International Application No. PCT/EP2016/051446; International Filing Date: Jan. 25, 2016; dated Jun. 6, 2016; 6 pages.
Written Opinion of the International Searching Authority for International Application No. PCT/EP2016/051452; International filing date: Jan. 25, 2016; dated Jun. 8, 2016; 6 pages.
Written Opinion; Internationnal Application No. PCT/EP2016/051446; International Filing Date: Jan. 25, 2016; dated Jun. 6, 2016; 6 pages.

* cited by examiner

*Primary Examiner* — Vickey Nerangis
(74) *Attorney, Agent, or Firm* — Cantor Colburn LLP

(57) ABSTRACT

A rubber composition includes an elastomer component including a functionalized elastomer, a reinforcing filler, and a coupling agent. The functionalized elastomer includes an epoxy functional group, a hydroxy functional group, and a $C_1$-$C_{32}$ hydrocarbyl-substituted thio functional group. The hydroxy functional group and the $C_1$-$C_{32}$ hydrocarbyl-substituted thio functional group are vicinal functional groups.

14 Claims, No Drawings

RUBBER COMPOSITION, METHOD OF MAKING, AND ARTICLES MADE THEREFROM

CROSS-REFERENCE TO RELATED APPLICATIONS

This application is a National Stage application of PCT/EP2016/051452, filed Jan. 25, 2016, which claims the benefit of U.S. Provisional Application No. 62/108,698, filed Jan. 28, 2015, both of which are incorporated by reference herein in their entirety.

BACKGROUND

Approximately 20-30% of a vehicle's fuel consumption relates to its tires. Vehicular tires have a tendency to resist rolling while in operation, due at least in part to adhesion of the tire's rubber to the road it is rolling on. Vehicles overcome the rolling resistance of tires by producing more energy, thereby burning more fuel. Low rolling resistance tires require less energy as the tire rolls, thereby increasing a vehicle's fuel efficiency. Reducing rolling resistance in tires is therefore desirable for cars configured to meet today's increasingly demanding standards for lower fuel consumption and reduced carbon dioxide emission.

Tire manufacturers have taken a number of approaches to developing and manufacturing low rolling resistance tires. For example, incorporation of functionalized elastomers into vehicular rubber tires can improve tire performance properties. The functional groups can act to modify the interaction of the elastomer with the fillers that are also present in tires, primarily silica. Functionalization of elastomers can be achieved either during or after polymerization. Functionalization during polymerization uses functional monomers, initiators, or termination agents. Functionalization during polymerization, i.e., co-polymerization and/or chain-end functionalization, has several known disadvantages. For example, copolymerization often requires complex syntheses to make the functional monomers. A further limitation is the choice of suitable functional groups for functionalization during polymerization, as the functional groups are limited to those that do not react with the polymerization initiator. Chain-end functionalization can be accomplished, but due to the relatively high molecular weight of the tire rubber, the weight ratio of end groups to main chain can be too low, so that the end groups do not significantly impact the elastomer-filler interaction.

Post-polymerization functionalization can be achieved by a variety of methods. For example, silane coupling agents can be used in conjunction with silica fillers. Use of the silanes, however, can lead to an undesirable increase in composition viscosity during tire manufacturing.

There remains a need in the art for improved rubber that can overcome the above-described technical challenges, in particular, rubber compositions that include functionalized elastomers that can improve tire performance properties.

BRIEF DESCRIPTION

A rubber composition comprises an elastomer component comprising a functionalized elastomer, wherein the functionalized elastomer comprises an epoxy functional group, a hydroxy functional group, and a $C_1$-$C_{32}$ hydrocarbyl-substituted thio functional group, wherein the hydroxy functional group and the $C_1$-$C_{32}$ hydrocarbyl-substituted thio functional group are vicinal functional groups; a reinforcing filler; and a coupling agent.

A method of preparing the rubber composition comprises combining the elastomer component, the reinforcing filler, and the coupling agent to form the rubber composition.

Articles comprising the rubber composition are also disclosed, in particular, tire components comprising the rubber composition.

The above described and other features are exemplified by the following detailed description.

DETAILED DESCRIPTION

The inventors hereof have discovered a rubber composition including an elastomer component comprising a functionalized elastomer, a reinforcing filler, and a coupling agent. The functionalized elastomer comprises an epoxy functional group, a hydroxy functional group, and a $C_1$-$C_{32}$ hydrocarbyl-substituted thio functional group. The hydroxy functional group and the substituted thio functional group of the functionalized elastomer are on adjacent carbon atoms, i.e., they are vicinal.

Such rubber compositions result in a reduction of tan δ values at 0° C. and at 60° C., compared to rubber compositions in which unfunctionalized elastomers are used. A reduced tan δ at 0° C. is desirable as it is understood to contribute to an improved wet-grip of a tire produced using such rubber compositions. A reduced tan δ at 60° C. is desirable as it is understood to contribute to a reduced rolling resistance of a tire produced using such rubber compositions. This is thought to be due to improved interaction between the filler and the elastomer components. The tan δ may be determined by dynamic mechanical analysis according to ASTM D5992.

The functionalized elastomers have a variety of uses, including in vehicular tires. The rubber compositions disclosed herein advantageously exhibit low rolling resistance and improved wet traction. Therefore the rubber compositions can be useful in, for example, the manufacture of improved tire treads.

The rubber composition comprises an elastomer component comprising a functionalized elastomer. The functionalized elastomer comprises an epoxy functional group, a hydroxy functional group, and a $C_1$-$C_{32}$ hydrocarbyl-substituted thio functional group. In some embodiments, the hydroxy and the substituted thio functional group are on adjacent carbons, i.e., they are vicinal. The functionalized elastomer can be prepared according to a post-polymerization functionalization method wherein an epoxidized elastomer is subjected to epoxy ring-opening with a substituted thiol, for example a $C_1$-$C_{32}$ hydrocarbyl-substituted thiol.

Epoxidized elastomers can be synthesized or obtained commercially. Methods for epoxidizing elastomers are generally known, and include, for example, peroxide-mediated epoxidation of an unsaturated elastomer. Epoxidized elastomers contain an epoxy (oxirane) functional group as a result of epoxidation. Elastomers, also known as rubbers, are amorphous viscoelastic polymers. Unsaturated elastomers have a plurality of carbon-carbon double bonds. The degree of unsaturation can be expressed in mole percent (mol %) unsaturation. For example, the elastomers can have a degree of unsaturation of at least 0.1 mol %, at least 0.5 mol %, at least 1 mol %, at least 2 mol % or at least 5 mol %, up to 80 mol %. For example, the degree of unsaturation can be 0.1 to 60 mole %, or 0.1 to 50 mol %, or 0.1 to 40 mol %.

The unsaturated elastomer used to prepare the functionalized elastomer can be a homopolymer or copolymer, uncrosslinked, crosslinked, vulcanized, (e.g., vulcanized rubber) or the like, with unsaturation in the backbone or in side chains. The elastomers can have a glass transition temperature (Tg) below 20° C., or below 0° C., for example from −110° C. to 20° C. or −90° C. to −10° C., C as determined according to ASTM D7426-08 (2013). The elastomers can be of natural origin or synthetic, and can be obtained, for example, by solution polymerization, emulsion polymerization or gas-phase polymerization of one or more conjugated diolefins, optionally combined with one or more ethylenically unsaturated comonomers such as monovinyl arenes, $C_1$-$C_6$ alkyl (meth)acrylates, and the like.

Examples of unsaturated elastomers include natural polyisoprene rubber, a synthetic polyisoprene rubber, a homopolymer of 1,3-butadiene, 2-methyl-1,3-butadiene, 1,3-pentadiene, 2-chloro-1,3 butadiene, or 2,3-dimethyl-1,3-butadiene, a copolymer of 1,3-butadiene, 2-methyl-1,3-butadiene, 1,3-pentadiene, 2-chloro-1,3 butadiene, or 2,3-dimethyl-1,3-butadiene with styrene, alpha-methylstyrene, acrylonitrile, isoprene, methacrylonitrile, methyl acrylate, ethyl acrylate, methyl methacrylate, ethyl methacrylate, or vinyl acetate, ethylene-vinyl acetate, chloroprene rubber, butyl rubber, halogenated butyl rubber, nitrile rubber, hydrogenated nitrile rubber, ethylene-propylene rubber, ethylene-propylene-diene rubber, unsaturated silicone rubber, or a combination comprising at least one of the foregoing.

Specific elastomers include polybutadiene rubber, poly (acrylonitrile-butadiene), poly(styrene-butadiene) rubber, polyisoprene rubber, neoprene rubber, preferably polybutadiene rubber, poly(styrene-butadiene) rubber, or a combination comprising at least one of the foregoing. For example, in some embodiments, the functionalized elastomer is a functionalized poly(styrene-butadiene) rubber having a vinyl content of 10 to 60 mole percent and a styrene content of 5 to 50 mole percent.

Epoxidation of the unsaturated elastomers can be achieved by the use of epoxidizers, including, for example, peroxides such as peroxyacids, peracids, inorganic peroxyacids, organic peroxy acids, and the like. Preferred inorganic peroxyacids are peroxymonosulfuric acid, peroxyphosphoric acid, perboric acid, perborates, and the like. Among the organic peroxy acids, peracetic acid, peroxybenzoic acid, or m-chloroperoxybenzoic acid (m-CPBA) can be used.

The quantity of the peroxide in the epoxidation is selected to achieve the desired degree of epoxidation, and can be determined by one of ordinary skill in the art without undue experimentation. For example the amount of peroxide can be between 5 and 100 weight percent (wt. %) based on the weight of the unsaturated elastomer, or can be 20 to 90 wt. %, or 30 to 80 wt. %, or 40 to 80 wt. %, based on the weight of the unsaturated elastomer.

Preferably, epoxidation is carried out in the presence of a solvent. The solvent, if used, is selected to dissolve the unsaturated elastomer. Examples of suitable solvents include aliphatic, cycloaliphatic, halogenated aliphatic or cycloaliphatic, heterocycloaliphatic, aromatic, heteroaromatic solvents, for example, dichloromethane, chloroform, carbon tetrachloride, pentane, n-hexane, cyclopentane, cyclohexane, n-heptane, benzene, toluene, xylene including o-, m-, p-xylene, cumene, tetrahydrofuran, dioxane, pyridine, or a combination comprising at least one of the foregoing. The elastomer can have a concentration in the solvent of 1 to 22% (weight/volume (w/v)), 1 to 20% (w/v), 1 to 18% (w/v), 2 to 16% (w/v), 2 to 12% (w/v), preferably 2 to 10% (w/v), more preferably 2 to 8% (w/v). Of course, other concentrations can be used.

Conditions for epoxidation can be determined without undue experimentation, for example, a temperature of 0 to 100° C., preferably 20 to 80° C., or 20 to 40° C., for 1 to 6 hours, at atmospheric pressure.

In some embodiments, not all of the unsaturated groups are reacted during elastomer functionalization, such that double bonds remain in the functionalized elastomer. For example, the epoxidized elastomers can have a degree of epoxidation of 1 to 50 mol %, 1 to 40 mol %, 1 to 30 mol %, 2 to 40 mol %, 2 to 30 mol %, or 3 to 30 mol %.

To form the functionalized elastomer, the epoxidized elastomer is reacted with a substituted thiol to ring-open a portion of the epoxy groups and provide vicinal hydroxy and substituted thio groups. "Vicinal" as used herein means that the hydroxy and the substituted thio group arising from each ring opening are bonded to two different, adjacent carbon atoms.

The substituted thiol is a $C_1$-$C_{32}$ hydrocarbyl-substituted thiol, where the $C_1$-$C_{32}$ hydrocarbyl can be a substituted or unsubstituted $C_1$-$C_{32}$ alkyl group, a substituted or unsubstituted $C_2$-$C_{32}$ alkenyl group, a substituted or unsubstituted $C_3$-$C_{18}$ cycloalkyl group, a substituted or unsubstituted $C_3$-$C_{18}$ heterocycloalkyl group, a substituted or unsubstituted $C_6$-$C_{18}$ aryl group, or a substituted or unsubstituted $C_4$-$C_{18}$ heteroaryl group.

Preferably the $C_1$-$C_{32}$ hydrocarbyl-substituted thiol group is a substituted or unsubstituted $C_1$-$C_{16}$ alkyl group, a substituted or unsubstituted $C_3$-$C_{16}$ cycloalkyl group, a substituted or unsubstituted $C_3$-$C_{16}$ heterocycloalkyl group, a substituted or unsubstituted $C_6$-$C_{16}$ aryl group, a substituted or unsubstituted $C_4$-$C_{16}$ heteroaryl group, or a combination comprising at least one of the foregoing.

In an embodiment, the $C_1$-$C_{32}$ hydrocarbyl-substituted thiol group is a substituted or unsubstituted $C_1$-$C_{12}$ alkyl group, more preferably an unsubstituted $C_2$-$C_8$ alkyl group, most preferably an unsubstituted $C_3$-$C_8$ alkyl group.

The substituted thiol may for example be selected from 1-propanethiol, methyl-3-mercaptopropionate, 1-butanethiol, 2-butanethiol, 2-methyl-1-propanethiol, 2-methyl-2-propanethiol, 4-cyano-1-butanethiol, 1-pentanethiol, 3-methyl-1-butanethiol, 1-hexanethiol, butyl-3-mercaptopropionate, 1-heptanethiol, 1-octanethiol, 2-ethylhexanethiol, 1-nonanethiol, tert-nonyl mercaptan, 1-decanethiol, 1-undecanethiol, 1-dodecanethiol, tert-docecylmercaptan, 1-tetradecanethiol, 1-pentadecanethiol, 1-hexadecanethiol, cis-9-octadecene-1-thiol, 1-octadecenethiol, cyclopentanethiol, cyclohexanethiol, 2-phenylethanethiol, phenylthiol, halogenated phenylthiol, nitrophenylthiol, methoxyphenylthiol, 2-propene-1-thiol, 2-furanemethanethiol, 2-methyl-3-furanethiol, 2-(trimethylsilyl)ethanethiol, 1-adamantanethiol, 2-propene-1-thiol, or combinations thereof. Preferably, the substituted thiol is selected from 1-propanethiol, 1-butanethiol, 2-methyl-1-propanethiol, 1-pentanethiol, 3-methyl-1-butanethiol, 1-hexanethiol, 1-heptanethiol, 1-octanethiol, 2-ethylhexanethiol, cyclopentanethiol, cyclohexanethiol, 2-phenylethanethiol, phenylthiol, 2-propene-1-thiol, 2-furanemethanethiol, or combinations thereof.

The epoxy ring-opening can be conducted in the presence of a solvent. Examples of solvents are aliphatic, cycloaliphatic, halogenated aliphatic or cycloaliphatic, heterocycloaliphatic, aromatic, heteroaromatic solvents, preferably dichloromethane, chloroform, carbon tetrachloride, pentane, n-hexane, cyclopentane, cyclohexane, n-heptane, benzene, toluene, xylene including o-, m-, p-xylene, cumene, tetrahydrofuran, dioxane, or a combination comprising at least one of the foregoing.

The epoxidized elastomer can have a concentration in the solvent of 1 to 22% (w/v). For example, the epoxidized elastomer can have a concentration from 2 to 16% (w/v), 2 to 12% (w/v), 2 to 10% (w/v), 2 to 8% (w/v), or 2 to 6% (w/v).

The concentration of the substituted thiol in the solvent can be 5 to 70 wt. %, 10 to 70 wt. %, 5 to 60 wt. %, 10 to 60 wt. %, 15 to 60 wt. %, or preferably 15 to 50 wt. %, based on the weight of the epoxidized elastomer.

In some embodiments, the epoxy-ring opening is conducted in the presence of a catalyst capable of simultaneously opening the epoxy ring or promoting the addition of the substituted thiol. The catalyst can be acidic, for example perchloric acid, or a nucleophilic base. Exemplary bases include an alkali or alkaline earth oxide or hydroxide, such as sodium hydroxide, potassium hydroxide, magnesium hydroxide, or calcium hydroxide, a rare earth hydroxide such as lanthanum hydroxide or cerium hydroxide, an organic hydroxide such as a tetra($C_1$-$C_6$)alkyl ammonium hydroxide (e.g., tetrabutylammonium hydroxide, or an organic base such as a tertiary amine (e.g., 1,8-diazabicyclo [5.4.0]undec-7-ene, 1,4-diazabicyclo [2.2.2] octane, triethylamine, pyridine, or the like). A combination of different bases can be used. Preferably, the base is potassium hydroxide or tetrabutylammonium hydroxide. In some embodiments, the pH of the reaction mixture can be adjusted with the base. For example, the pH can be adjusted to a pH from 9 to 14, from 10 to 13, or from 10 to 12.

Preferably, the base is selected such that the base forms a homogeneous medium with the solvent used in epoxy ring-opening. If the solvent is immiscible or has low miscibility with the base, a heterogeneous mixture can form. If a heterogeneous mixture forms, epoxy ring-opening can be slow. Thus, in an embodiment, an alcoholic, e.g., a methanolic base solution is used. The alcoholic base solution can have a molarity of 0.1 to 10 molar (M) of the base in the alcohol. For example, the alcoholic solution can be from 0.2 to 10 M, 0.3 to 9 M, 0.5 to 8 M, 1 to 5 M, or 1 to 3 M. In an embodiment, epoxy ring-opening is conducted in THF as a solvent, with a methanolic base to provide a homogeneous medium.

The epoxy ring-opening is conducted at a temperature of 0 to 100° C., for example 20 to 80° C., for example 20 to 60° C. An effective time can be 1 hour to 5 days, depending on reactivity of the starting materials, temperature, and other reaction conditions. Atmospheric pressure or higher can be used. Isolation can be by precipitation with a nonsolvent such as methanol. After the precipitation, the functionalized elastomer can be collected, for example by filtration.

The functionalized elastomer can have a total hydroxy, substituted thio, and epoxy group functionalization of 1 to 15 mol %, 1 to 12 mol %, more preferably 1 to 10 mol %. In addition, the functionalized elastomer contains unsaturation. The relative ratios of each of the hydroxy, epoxy, thio, and unsaturated groups can be varied, by varying the epoxidation and epoxy ring-opening conditions, in order to adjust the properties of the functionalized elastomers. For example, based on the total number of the functionalized groups, the elastomer can comprise 1 to 30% epoxy groups, 0.1 to 30% hydroxyl groups, 0.1 to 30% substituted thio groups and 20 to 89.7% unsaturated groups, more specifically 1 to 20% epoxy groups, 0.1 to 20% hydroxyl groups, 0.1 to 20% substituted thio groups and 20 to 80% unsaturated groups.

The functionalized elastomers can have a glass transition temperature (Tg) below 20° C., or below 0° C., for example from −110° C. to 20° C. or −90° C. to −10° C., as determined according to ASTM D7426-08 (2013).

The functionalized elastomer can be present in the rubber composition in an amount of 10 to 70 weight percent (wt. %), preferably 10 to 60 wt. %, more preferably 20 to 60 wt. %, based on the total weight of the rubber composition.

In some embodiments, the elastomer component comprises 10 to 100 wt. % of the functionalized elastomer, based on the total weight of the elastomer component.

The elastomer component can optionally further comprise an elastomer different from the functionalized elastomer. In some embodiments, the elastomer different from the functionalized elastomer is devoid of an epoxy functional group, a hydroxy functional group, a $C_1$-$C_{32}$ hydrocarbyl-substituted thio functional group, or a combination thereof. For example, the elastomer different from the functionalized elastomer can be devoid of a combination of epoxy functional groups, hydroxy functional groups, and $C_1$-$C_{32}$ hydrocarbyl-substituted thio functional groups. The elastomer different from the functionalized elastomer can a homopolymer or a copolymer, uncrosslinked, crosslinked, vulcanized, (e.g., vulcanized rubber) or the like, with unsaturation in the backbone or in side chains. The elastomers can have a glass transition temperature (Tg) below 20° C., or below 0° C., for example from −110° C. to 20° C. or −90° C. to −10° C. The elastomers can be of natural origin or synthetic, and can be obtained, for example, by solution polymerization, emulsion polymerization or gas-phase polymerization of one or more conjugated diolefins, optionally combined with one or more ethylenically unsaturated comonomers such as monovinyl arenes, $C_1$-$C_6$ alkyl (meth)acrylates, and the like.

In some embodiments, the elastomer different from the functionalized elastomer can be, for example, natural polyisoprene rubber, a synthetic polyisoprene rubber, a homopolymer of 1,3-butadiene, 2-methyl-1,3-butadiene, 1,3-pentadiene, 2-chloro-1,3 butadiene, or 2,3-dimethyl-1,3-butadiene, a copolymer of 1,3-butadiene, 2-methyl-1,3-butadiene, 1,3-pentadiene, 2-chloro-1,3 butadiene, or 2,3-dimethyl-1,3-butadiene with styrene, alpha-methylstyrene, acrylonitrile, isoprene, methacrylonitrile, methyl acrylate, ethyl acrylate, methyl methacrylate, ethyl methacrylate, or vinyl acetate, ethylene-vinyl acetate, chloroprene rubber, butyl rubber, halogenated butyl rubber, nitrile rubber, hydrogenated nitrile rubber, ethylene-propylene rubber, ethylene-propylene-diene rubber, unsaturated silicone rubber, or a combination comprising at least one of the foregoing. In some embodiments, the elastomer different from the functionalized elastomer can include polybutadiene rubber, poly(acrylonitrile-butadiene), poly(styrene-butadiene) rubber, polyisoprene rubber, neoprene rubber, preferably polybutadiene rubber, poly(styrene-butadiene) rubber, or a combination comprising at least one of the foregoing.

When present, the elastomer different from the functionalized elastomer can be in an amount of 1 to 90 wt. %, preferably 10 to 80 wt. %, more preferably 20 to 60 wt. %, based on the total weight of the elastomer component.

In addition to the elastomer component, the rubber composition further comprises a reinforcing filler. The reinforcing filler can comprise organic fillers, inorganic fillers (e.g., mineral fillers), or a combination thereof. Exemplary reinforcing fillers can include silicas prepared, for example, by precipitation of solutions of silicates, or flame hydrolysis of silicon halides, mixed oxides comprising silicas and other metal oxides (e.g., Al, Mg, Ca, Ba, Zn, Zr, or Ti oxides), synthetic silicates (e.g., aluminum silicate), alkaline earth metal silicates (e.g., magnesium silicate or calcium silicate), natural silicates (e.g., kaolin and other naturally occurring types of silica), glass fibers and glass-fiber products (e.g., mats, strands, and the like), glass microbeads, metal oxides (e.g., zinc oxide, calcium oxide, magnesium oxide, or aluminium oxide), metal carbonates (e.g., magnesium carbonate, calcium carbonate, or zinc carbonate), metal hydroxides (e.g., aluminium hydroxide or magnesium hydroxide), rubber gels (e.g., polybutadiene-based rubber gels, butadiene-styrene copolymers, butadiene-acrylonitrile copolymers and polychloroprene), carbon blacks prepared by the flame-black process, channel-black process, furnace-black process, gas-black process, thermal-black process, acetylene-black process or arc process (e.g. super abrasion furnace (SAF), intermediate SAF, intermediate SAF low structure (ISAF-LS), intermediate SAF high modulus (ISAF-HM), intermediate SAF low modulus (ISAF-LM), intermediate SAF high structure (ISAF-HS), conductive furnace (CF), super conductive furnace (SCF), high abrasion furnace (HAF), high abrasion furnace low structure (HAF-LS), HAF-HS, fine furnace high structure (FF-HS), semi reinforcing furnace (SRF), extra conductive furnace (XCF), fast extruding furnace (FEF), fast extruding furnace low structure (FEF-LS), fast extruding furnace high structure (FEF-HS), general purpose furnace (GPF), GPF-HS, all purpose furnace (APF), SRF-LS, SRF-LM, SRF-HS, SRF-HM and medium thermal (MT) carbon blacks, or the following types according to ASTM classification: N110, N219, N220, N231, N234, N242, N294, N326, N327, N330, N332, N339, N347, N351, N356, N358, N375, N472, N539, N550, N568, N650, N660, N754, N762, N765, N774, N787 and N990 carbon blacks), or a combination comprising at least one of the foregoing fillers. In some embodiments, the filler is an inorganic filler, for example the filler comprises silica. In some embodiments, the filler has a surface area of 40 to 400 square meters per gram ($m^2/g$), preferably 80 to 300 $m^2/g$. In some embodiments, the filler is silica having a surface area of 40 to 400 $m^2/g$, preferably 80 to 300 $m^2/g$. In some embodiments, the rubber composition is devoid of a filler comprising carbon black, for example the rubber composition comprises less than 1 wt. % carbon black, for example 0.5 wt. % carbon black, for example 0.1 wt. % carbon black.

The rubber composition can include the reinforcing filler in an amount of 20 to 120 parts by weight, preferably 50 to 100 parts by weight, based on 100 parts by weight of the elastomer component.

The rubber composition also includes a coupling agent, for example a silane coupling agent. Exemplary silane coupling agents can include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, and the like, and combinations thereof. In some embodiments, the silane coupling agent is a polysulfide silane coupling agent having 2 to 4 sulfur atoms forming a polysulfide bridge. For example, the coupling agent can comprise a bis(3-triethoxysilylpropyl) di-, tri-, or tetrasulfide, preferably bis(3-triethoxysilylpropyl) tetrasulfide.

The coupling agent can be present in the rubber composition in an amount of 5 to 10 wt. % based on the total weight of the reinforcing filler.

The rubber composition disclosed herein can optionally further comprise an additive with the proviso that the presence of the additive(s) does not adversely affect the properties of the rubber composition. The additive can comprise an antioxidant, a vulcanizing agent, an accelerator, a heat stabilizer, a light stabilizer, a processing aid, a plasticizer, a tackifier, an activator, or a combination comprising at least one of the foregoing additives.

The additives can be present in the rubber composition in amounts that are generally known to be effective. For example, typical amounts of tackifiers can be about 0.5 to about 10 parts by weight, per 100 parts by weight rubber (phr), for example about 1 to about 5 phr. Typical amounts of plasticizers can be about 1 to about 50 phr. Plasticizers can include, for example, aromatic, napthenic, and/or paraffinic processing oils. Typical amounts of antioxidants can be about 1 to about 5 phr. Typical amounts of antiozonants can be about 1 to 5 phr. Typical amounts of fatty acids (e.g., stearic acid) can be about 0.5 to about 3 phr. Typical amounts of zinc oxide can be about 2 to about 5 phr. Typical amounts of waxes (e.g., microcrystalline waxes) can be about 1 to about 5 phr. Typical amounts of peptizers (e.g., pentachlorothiophenol and dibenzamidodiphenyl disulfide) can be about 0.1 to about 1 phr.

Vulcanization of the rubber composition is conducted in the presence of a vulcanizing agent, generally a sulfur vulcanizing agent. Examples of suitable sulfur vulcanizing agents can include elemental sulfur (free sulfur) or sulfur-donating vulcanizing agents, for example, an amine disulfide, polymeric polysulfide, or sulfur olefin adducts. In some embodiments, the sulfur vulcanizing agent is elemental sulfur. Sulfur vulcanizing agents can be present in an amount of about 0.5 to about 8 phr, or for example 0.5 to about 4 phr, or for example about 1.5 to about 2.5 phr.

Accelerators can be included to control the time and/or temperature required for vulcanization and to improve the properties of the vulcanizate, and can comprise for example, amines, disulfides, guanidines, thioureas, thiazoles, thiurams, sulfenamides, dithiocarbamates, and xanthates. In some embodiments, the primary accelerator is a sulfenamide. An accelerator can be present in an amount of about 0.5 to about 4, for example about 0.8 to about 2 phr.

In some embodiments, the rubber composition comprises the additives in an amount of 2 to 70 parts by weight, based on 100 parts by weight of the rubber.

The rubber composition can have a lower tan delta (tan δ) value at 60° C. measured using dynamic mechanical analysis compared to the same rubber composition except with an unfunctionalized elastomer in place of the functionalized elastomer. A low tan δ value indicates that the rubber composition has a lower rolling resistance compared to the same rubber composition except with an unfunctionalized elastomer in place of the functionalized elastomer.

The rubber composition disclosed herein can be prepared by various methods according to general techniques which are known. The rubber compositions can generally be made by combining the elastomer component, the reinforcing filler, and the coupling agent to form the rubber composition, and optionally, any additives. The combining can include, for example, mixing the components of the rubber composition, for example by a thermomechanical mixing step. The thermomechanical mixing step generally comprises a mechanical working in a mixer or extruder for a period of time suitable to produce a rubber temperature between 140° C. and 160° C. The appropriate duration of the thermomechanical working varies as a function of the operating conditions, and the volume and nature of the components. For example, the thermomechanical working can be from 1 to 20 minutes. The components of the rubber composition can be combined and mixed in any mixing apparatus suitable for mixing rubber, for example in a Banbury type mixer, laboratory mixer, rubber mill, extruder, or the like.

In some embodiments, the components of the rubber composition can be combined in at least two stages, for example a non-productive stage and a productive stage. For example, the rubber composition can be prepared by mixing the elastomer component, reinforcing filler, and coupling agent, exclusive of any rubber curatives, in a mixing step with a mechanical mixer, usually referred to as "non-productive" mix stage(s), to a temperature of, for example, about 140° C. to about 160° C. for about 1 to about 6 minutes, followed by a final mix stage in which the curatives, such as sulfur, accelerators, and other additives, are added and mixed therewith for about 1 to about 4 minutes to a temperature of, for example, about 90° C. to about 125° C. The terms "non-productive" and "productive" mix stages are well known to those having skill in the rubber mixing art. In some embodiments, the rubber composition is conventionally cooled to a temperature below about 40° C. between the mix stages.

Vulcanization of the rubber composition can be carried out under conditions which are generally known, for example at a temperature of, for example, about 130° C. to about 200° C. Preferably, the vulcanization is conducted at a temperature of, for example, about 140° C. to about 190° C. Any of the usual vulcanization processes can be used such as heating in a press or mold, heating with superheated steam or hot air or in a salt bath.

Articles comprising the rubber composition described herein represent another aspect of the present disclosure. The rubber composition can be applied to various rubber products, for example various industrial rubber products. For example, the rubber composition can be used in articles including, but not limited to, a component of a tire, a tire tread, a component of a shoe, a hose, a tube, a belt, an engine mount, a seal, a gasket, and the like.

In a preferred embodiment, the article comprising the rubber composition is a component of a tire (e.g., a tire tread) for a vehicle, for example, cars, trucks, and the like. Without being bound by theory, it is believed that functional groups of the functionalized elastomer of the rubber composition, in particular the hydroxy functional group, can modify the interaction between the elastomer and filler in a tire tread. Additionally, the loss of unsaturation due to functionalization can be compensated by the presence of the $C_1$-$C_{32}$ hydrocarbyl-substituted thio functional group, which can participate in crosslinking or vulcanization. Accordingly, tire treads comprising the rubber composition can have reduced rolling resistance.

The invention is further illustrated by the following non-limiting examples.

EXAMPLES

The materials used for the following Examples are provided in Table 1.

TABLE 1

| Component | Description | Supplier |
|---|---|---|
| BR | Polybutadiene having 98% cis-1,4 polybutadiene content | Goodyear |
| SBR | Styrene-butadiene rubber having 50 wt. % vinyl content, 25 wt. % styrene, and 27.3 wt. % oil content | Lanxess |
| Silica | Silica having a surface area of 180 $m^2$/g, obtained as Ultrasil VN3 | Evonik |
| Coupling Agent | Bis(triethoxysilylpropyl)tetrasulfide coupling agent, obtained as "Si-69" | Evonik |
| ZnO | White Seal Zinc Oxide | I.C.C. |
| Stearic Acid | Stearic acid, 92%, obtained as Palmera A9218 | KLK-OLEO |
| Vivatec500 | Mineral oil, PCA content <3% | Hansen & Rosenthal KG |
| 6PPD | N-(1,3-dimethylbutyl)-N'-phenyl-p-phenylenediamine, obtained as Vulkanox 4020/LG | Lanxess |
| TMQ | 2,2,4-trimethyl-1, 2-dihydroquinoline, Polymerized, obtained as Vulkanox HS/LG | Lanxess |
| Micro. Wax | Microcrystalline Wax, obtained as Antilux 654 | RheinChemie |
| Sulfur | 654 Rubber Maker Sulphur | Agricultural & Industrial Sulphur |
| CZ | N-cyclohexyl-2-benzothiazyl sulphenamide, obtained as Rhenogran CBS-80 | RheinChemie |
| DPG | N,N'-diphenyl guanidine, obtained as Rhenogran DPG-80 | RheinChemie |

Functionalized butadiene rubber ("F-BR") was prepared according to the following procedure. A 5% (w/v) solution of polybutadiene rubber with a 1,4-cis content of 98% was prepared in tetrahydrofuran. Next, 40 wt. % of m-chloroperoxybenzoic acid (m-CPBA) was added to the solution and the reaction mixture was stirred at 23° C. for 3 hours. Upon completion the reaction mixture was quenched with a 1.5 molar tetrabutylammonium hydroxide (TBAH) solution in methanol. To this mixture, a 30% (w/v) solution of propanethiol in methanol was added. The reaction mixture was stirred at 50-55° C. for 7 hours, then cooled to 23° C., and poured into excess methanol (for example, a volumetric ratio of reaction mixture:methanol of 1:2.5). A precipitate formed, which was isolated and dried at 23° C.

The filtered product was characterized by $^1$H NMR and infrared (IR) spectroscopic methods. The functionalized elastomer comprises units as shown in the formula below

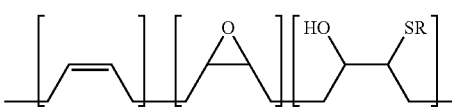

wherein R is n-propyl. Other units can be present in the elastomer, e.g., units arising from 1,2-addition.

Functionalized elastomers were prepared having varying levels of functionality. Functionalized elastomers used in the following examples are described in Table 2.

TABLE 2

| Functionalized Elastomer | Description |
| --- | --- |
| F-BR-1 | Functionalized butadiene rubber having 2 mol % epoxy and 0.36 mol % sulfide. |
| F-BR-2 | Functionalized butadiene rubber having 4 mol % epoxy and 2.6 mol % sulfide. |
| F-BR-3 | Functionalized butadiene rubber having 9 mol % epoxy and 3.2 mol % sulfide. |
| F-SBR-1 | Functionalized styrene-butadiene rubber having 5 mol % epoxy and 2.64 mol % sulfide. |

Comparative Example 1 and Examples 1-3

Rubber compositions were prepared as summarized in Table 3. The compositions were prepared by mixing the components using an internal Banbury mixer of 1.6 liters (fill factor is about 0.75), at an initial temperature is about 70° C. The polymers were first blended for 1 minute. Silica, coupling agent and other additives were added into the mixer and mixed for 4 minutes at a speed of 60 rpm and finally discharged at a temperature of 150 to 160° C. Additives (e.g., accelerators, sulfur) were added to the mixture and the mixture was mixed further for 3 to 4 minutes at a temperature of 90 to 100° C.

The amount of each component shown in Table 3 is shown in parts by weight per 100 parts of the rubber component. Dynamic mechanical testing of each of the rubber compositions was performed using a Dynamic Mechanical Analyzer (DMA VA4000), according to ASTM D5992. The test conditions were 0.1% strain, frequency of 11 Hertz, and temperature sweep from −70° C. to 80° C. at 2° C./min. The results of the dynamic mechanical testing is also summarized in Table 3.

TABLE 3

|  | CE1 | E1 | E2 | E3 |
| --- | --- | --- | --- | --- |
| Components |  |  |  |  |
| BR | 20 |  |  |  |
| F-BR-1 |  | 20 |  |  |
| F-BR-2 |  |  | 20 |  |
| F-BR-3 |  |  |  | 20 |
| SBR | 110 | 110 | 110 | 110 |
| Silica | 70 | 70 | 70 | 70 |
| Coupling Agent | 6 | 6 | 6 | 6 |
| ZnO | 3 | 3 | 3 | 3 |
| Stearic Acid | 2 | 2 | 2 | 2 |
| Vivatec500 | 5 | 5 | 5 | 5 |
| 6PPD | 2 | 2 | 2 | 2 |
| TMQ | 2 | 2 | 2 | 2 |
| Micro. Wax | 2 | 2 | 2 | 2 |
| Sulfur | 2 | 2 | 2 | 2 |
| CZ | 2 | 2 | 2 | 2 |
| DPG | 2 | 2 | 2 | 2 |

TABLE 3-continued

|  | CE1 | E1 | E2 | E3 |
| --- | --- | --- | --- | --- |
| Properties |  |  |  |  |
| Tan δ, 60° C. | 0.103 | 0.1 | 0.09 | 0.09 |
| Tan δ, 0° C. | 0.413 | 0.454 | 0.475 | 0.52 |
| Tg (° C.) | −10.8 | −9.5 | −8.6 | −7.6 |

The rubber compositions of Examples 1-3 (E1-E3) were prepared using functionalized butadiene rubbers having varying amounts of epoxy and sulfide functionalization, while the rubber composition of Comparative Example 1 (CE1) was prepared using an unfunctionalized butadiene rubber.

Dynamic mechanical testing of the rubber compositions demonstrated that the compositions of E2 and E3 exhibited dramatically higher tan δ values at 0° C. (0.475 and 0.52, respectively) and lower tan δ values at 60° C. of 0.09 as compared to the rubber composition of CE1, having a tan δ value at 0° C. of 0.413, and a tan δ value at 60° C. of 0.103. This result is indicates that these rubber compositions can have improved wet-grip and lower rolling resistance when used in a tire compared to when only unfunctionalized rubber is included. This advantageous feature of the rubber compositions of E2 and E3 is thought to be due to improved interaction between the silica filler and the rubber components due to the presence of the functionality in the rubber. The glass transition temperature (Tg) of the rubber compositions of E1-E3 C as determined according to ASTM D7426-08 (2013) was also observed to increase with increasing amount of functionality present in the functionalized rubber compared to the Tg of CE1 (−10.8° C.).

Comparative Example 2 and Examples 4-7

Additional rubber compositions were prepared to demonstrate the effect of varying the amount of functionalized SBR in the composition. The rubber compositions were prepared as shown in Table 4. The rubber compositions were prepared according to the same method as described above for CE1 and E1-E3. The amount of each component shown in Table 4 is shown in parts by weight per 100 parts of the rubber component (phr). Each of the rubber compositions was further evaluated for dynamic mechanical properties. The results of the dynamic mechanical testing are also summarized in Table 4 for these compositions.

TABLE 4

|  | CE2 | E4 | E5 | E6 | E7 |
| --- | --- | --- | --- | --- | --- |
| Components |  |  |  |  |  |
| SBR | 137.5 | 110 | 83 | 55 | 28 |
| F-SBR-1 | 0 | 25 | 51 | 77 | 102 |
| Silica | 70 | 70 | 70 | 70 | 70 |
| Coupling Agent | 6 | 6 | 6 | 6 | 6 |
| ZnO | 3 | 3 | 3 | 3 | 3 |
| Stearic Acid | 2 | 2 | 2 | 2 | 2 |
| Vivatec500 | 5 | 7.5 | 8.5 | 10.5 | 12.5 |
| 6PPD | 2 | 2 | 2 | 2 | 2 |
| TMQ | 2 | 2 | 2 | 2 | 2 |
| Micro. Wax | 2 | 2 | 2 | 2 | 2 |
| Sulfur | 2 | 2 | 2 | 2 | 2 |
| CZ | 2 | 2 | 2 | 2 | 2 |
| DPG | 2 | 2 | 2 | 2 | 2 |

TABLE 4-continued

| | CE2 | E4 | E5 | E6 | E7 |
|---|---|---|---|---|---|
| Properties | | | | | |
| Tan δ, 60° C. | 0.116 | 0.115 | 0.113 | 0.11 | 0.106 |
| Tan δ, 0° C. | 0.615 | 0.551 | 0.515 | 0.447 | 0.449 |
| Tg (° C.) | −4.8 | −2.3 | 4.4 | 8.3 | 9.9 |

The rubber compositions of Examples 4-7 (E4-E7) demonstrate that the dynamic mechanical properties of the rubber compositions can be adjusted by altering the amount of functionalized styrene-butadiene rubber (F-SBR) incorporated into the composition. Specifically, the tan δ values at 60° C. decreased with increasing amount of functionalized rubber component. For example, the composition of E7, incorporating the highest amount of functionalized rubber at 102 phr, obtained a tan δ value at 60° C. of 0.106, whereas the rubber composition of CE2 demonstrated a tan δ value at 60° C. of 0.116. This suggests that the rubber compositions of E4-E7 would have lower rolling resistance compared to the composition of CE2. The rubber composition of CE2 also demonstrated the highest tan δ value at 0° C. of 0.615. Tan δ values at 60° C. for the compositions of E4-E7 decreased as the amount of functionalized rubber component increased.

The compositions, methods, and articles are further illustrated by the following embodiments, which are non-limiting.

Embodiment 1

A rubber composition comprising an elastomer component comprising a functionalized elastomer, wherein the functionalized elastomer comprises an epoxy functional group, a hydroxy functional group, and a $C_1$-$C_{32}$ hydrocarbyl-substituted thio functional group, wherein the hydroxy functional group and the $C_1$-$C_{32}$ hydrocarbyl-substituted thio functional group are vicinal functional groups; a reinforcing filler; and a coupling agent.

Embodiment 2

The rubber composition of embodiment 1 or embodiment 2, wherein the rubber composition has a lower tan delta value at 60° C. measured using dynamic mechanical analysis compared to the same rubber composition except with an unfunctionalized elastomer in place of the functionalized elastomer.

Embodiment 3

The rubber composition of any one or more of the preceding embodiments, wherein the functionalized elastomer has a glass transition temperature of −10 to −90° C., as determined according to ASTM D7426-08 (2013).

Embodiment 4

The rubber composition of any one or more of the preceding embodiments, wherein the hydrocarbyl group is a substituted or unsubstituted $C_1$-$C_{32}$ alkyl group, a substituted or unsubstituted $C_2$-$C_{32}$ alkenyl group, a substituted or unsubstituted $C_3$-$C_{18}$ cycloalkyl group, a substituted or unsubstituted $C_3$-$C_{18}$ heterocycloalkyl group, a substituted or unsubstituted $C_6$-$C_{18}$ aryl group, or a substituted or unsubstituted $C_4$-$C_{18}$ heteroaryl group, or a combination comprising at least one of the foregoing; preferably a substituted or unsubstituted $C_1$-$C_{16}$ alkyl group, a substituted or unsubstituted $C_3$-$C_{16}$ cycloalkyl group, a substituted or unsubstituted $C_3$-$C_{16}$ heterocycloalkyl group, a substituted or unsubstituted $C_6$-$C_{16}$ aryl group, a substituted or unsubstituted $C_4$-$C_{16}$ heteroaryl group, or a combination comprising at least one of the foregoing; more preferably a substituted or unsubstituted $C_1$-$C_{12}$ alkyl group, preferably an unsubstituted $C_2$-$C_8$ alkyl group, more preferably an unsubstituted $C_3$-$C_8$ alkyl group.

Embodiment 5

The rubber composition of any one or more of the preceding embodiments, wherein the functionalized elastomer is a functionalized unsaturated elastomer, wherein the unsaturated elastomer comprises a natural polyisoprene rubber, a synthetic polyisoprene rubber, a homopolymer of 1,3-butadiene, 2-methyl-1,3-butadiene, 1,3-pentadiene, 2-chloro-1,3-butadiene, or 2,3-dimethyl-1,3-butadiene, a copolymer of 1,3-butadiene, 2-methyl-1,3-butadiene, 1,3-pentadiene, 2-chloro-1,3-butadiene, or 2,3-dimethyl-1,3-butadiene with styrene, alpha-methylstyrene, acrylonitrile, isoprene, methacrylonitrile, methyl acrylate, ethyl acrylate, methyl methacrylate, ethyl methacrylate, or vinyl acetate, a chloroprene rubber, butyl rubber, halogenated butyl rubber, nitrile rubber, hydrogenated nitrile rubber, ethylene-propylene rubber, ethylene-propylene-diene rubber, unsaturated silicone rubber, or a combination comprising at least one of the foregoing, preferably wherein the unsaturated elastomer comprises polybutadiene rubber, poly(acrylonitrile-butadiene) rubber, poly(styrene-butadiene) rubber, polyisoprene rubber, neoprene rubber, preferably polybutadiene rubber, poly(styrene-butadiene) rubber, or a combination comprising at least one of the foregoing.

Embodiment 6

The rubber composition of any one or more of the preceding embodiments, wherein the functionalized elastomer has a total hydroxy, epoxy, and thio functionalization of 1 to 15 mole percent, preferably 1 to 12 mole percent, more preferably 1 to 10 mole percent.

Embodiment 7

The rubber composition of any one or more of the preceding embodiments, wherein the functionalized elastomer is a functionalized poly(styrene-butadiene) rubber having a vinyl content of 10 to 60 mole percent and a styrene content of 5 to 50 mole percent.

Embodiment 8

The rubber composition of any one or more of the preceding embodiments, wherein the functionalized elastomer further comprises unsaturation.

Embodiment 9

The rubber composition of any one or more of the preceding embodiments, comprising 10 to 70 wt. %, preferably 10 to 60 wt. %, more preferably 20 to 60 wt. % of the functionalized elastomer, based on the total weight of the rubber composition.

Embodiment 10

The rubber composition of any one or more of the preceding embodiments, wherein the elastomer component comprises 10 to 100 wt. % of the functionalized elastomer, based on the total weight of the elastomer component.

Embodiment 11

The rubber composition of any one or more of the preceding embodiments, further comprising 1 to 90 wt. %, preferably 10 to 80 wt. %, more preferably 20 to 60 wt. % of an elastomer different from the functionalized elastomer, based on the total weight of the elastomer component.

Embodiment 12

The rubber composition of embodiment 11, wherein the elastomer different from the functionalized elastomer is devoid of a combination of epoxy functional groups, hydroxy, and $C_1$-$C_{32}$ hydrocarbyl-substituted thio functional groups.

Embodiment 13

The rubber composition of embodiment 11 or 12, wherein the elastomer different from the functionalized elastomer comprises a natural polyisoprene rubber, a synthetic polyisoprene rubber, a homopolymer of 1,3-butadiene, 2-methyl-1,3-butadiene, 1,3-pentadiene, 2-chloro-1,3-butadiene, or 2,3-dimethyl-1,3-butadiene, a copolymer of 1,3-butadiene, 2-methyl-1,3-butadiene, 1,3-pentadiene, 2-chloro-1,3-butadiene, or 2,3-dimethyl-1,3-butadiene with styrene, alpha-methylstyrene, acrylonitrile, isoprene, methacrylonitrile, methyl acrylate, ethyl acrylate, methyl methacrylate, ethyl methacrylate, or vinyl acetate, a chloroprene rubber, butyl rubber, halogenated butyl rubber, nitrile rubber, hydrogenated nitrile rubber, ethylene-propylene rubber, ethylene-propylene-diene rubber, unsaturated silicone rubber, or a combination comprising at least one of the foregoing.

Embodiment 14

The rubber composition of any one or more of the preceding embodiments, wherein the reinforcing filler has a surface area of 40 to 400 m$^2$/g, preferably 80 to 300 m$^2$/g.

Embodiment 15

The rubber composition of any one or more of the preceding embodiments, wherein the reinforcing filler comprises silica.

Embodiment 16

The rubber composition of any one or more of the preceding embodiments comprising the reinforcing filler in an amount of 20 to 120 parts by weight, preferably 50 to 100 parts by weight, per 100 parts by weight of the elastomer component.

Embodiment 17

The rubber composition of any one or more of the preceding embodiments, wherein the coupling agent is a polysulfide silane coupling agent.

Embodiment 18

The rubber composition of embodiment 17, wherein the polysulfide silane coupling agent comprises a bis(3-ethoxysilylpropyl) polysulfide having 2 to 4 sulfur atoms forming a polysulfide bridge.

Embodiment 19

The rubber composition of any one or more of the preceding embodiments, comprising 5 to 10 wt. % of the coupling agent, based on the total weight of the reinforcing filler.

Embodiment 20

The rubber composition of any one or more of the preceding embodiments, further comprising up to an additive comprising an antioxidant, vulcanizing agent, accelerator, heat stabilizer, light stabilizer, processing aid, plasticizer, tackifier, activators, or a combination comprising at least one of the foregoing.

Embodiment 21

A method of preparing the rubber composition of any one or more of embodiments 1 to 20, the method comprising, combining the elastomer component, the reinforcing filler, and the coupling agent to form the rubber composition.

Embodiment 22

An article comprising the rubber composition of any one or more of embodiments 1 to 20.

Embodiment 23

The article of embodiment 22, wherein the article is a component of a tire.

Embodiment 24

The article of embodiment 22, wherein the article is a tire tread.

All ranges disclosed herein are inclusive of the endpoints, and the endpoints are independently combinable with each other. "Combination" is inclusive of blends, mixtures, alloys, reaction products, and the like. Furthermore, the terms "first", "second", and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term. Reference throughout the specification to "one embodiment", "another embodiment", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si), which can be present as one or more functional groups. "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—CH$_2$—) or propylene (—(CH$_2$)$_3$—)). "Alkenyl" and "alkenylene" mean a monovalent or divalent, respectively, straight or branched chain hydrocarbon group having at least one carbon-carbon double bond (e.g., ethenyl (—HC=CH$_2$) or propenylene (—HC(CH$_3$)=CH$_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —C$_n$H$_{2n-x}$ and —C$_n$H$_{2n-2x}$— wherein x is the number of cyclization(s). "Aryl" means a monovalent, monocyclic or polycyclic, aromatic group (e.g., phenyl or naphthyl). "Arylene" means a divalent, monocyclic or polycyclic, aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3) heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl, C$_{7-13}$ arylalkylene (e.g, benzyl), C$_{7-12}$ alkylarylene (e.g, toluyl), C$_{4-12}$ heterocycloalkyl, C$_{3-12}$ heteroaryl, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

The invention claimed is:

1. A rubber composition comprising
an elastomer component comprising a functionalized elastomer, wherein the functionalized elastomer comprises
an epoxy functional group,
a hydroxy functional group, and
a C$_1$-C$_{32}$ hydrocarbyl-substituted thio functional group, wherein the hydroxy functional group and the C$_1$-C$_{32}$ hydrocarbyl-substituted thio functional group are vicinal functional groups;
a reinforcing filler; and
a coupling agent.

2. The rubber composition according to claim 1, wherein the functionalized elastomer has a glass transition temperature of −10 to −90° C. as determined according to ASTM D7426-08 (2013).

3. The rubber composition of claim 1, wherein the hydrocarbyl group is
a substituted or unsubstituted C$_1$-C$_{32}$ alkyl group, a substituted or unsubstituted C$_2$-C$_{32}$ alkenyl group, a substituted or unsubstituted C$_3$-C$_{18}$ cycloalkyl group, a substituted or unsubstituted C$_3$-C$_{18}$ heterocycloalkyl group, a substituted or unsubstituted C$_6$-C$_{18}$ aryl group, or a substituted or unsubstituted C$_4$-C$_{18}$ heteroaryl group, or a combination comprising at least one of the foregoing.

4. The rubber composition of claim 1, wherein the functionalized elastomer is a functionalized unsaturated elastomer,
wherein the unsaturated elastomer comprises a natural polyisoprene rubber, a synthetic polyisoprene rubber, a homopolymer of 1,3-butadiene, 2-methyl-1,3-butadiene, 1,3-pentadiene, 2-chloro-1,3-butadiene, or 2,3-dimethyl-1,3-butadiene, a copolymer of 1,3-butadiene, 2-methyl-1,3-butadiene, 1,3-pentadiene, 2-chloro-1,3-butadiene, or 2,3-dimethyl-1,3-butadiene with styrene, alpha-methylstyrene, acrylonitrile, isoprene, methacrylonitrile, methyl acrylate, ethyl acrylate, methyl methacrylate, ethyl methacrylate, or vinyl acetate, a chloroprene rubber, butyl rubber, halogenated butyl rubber, nitrile rubber, hydrogenated nitrile rubber, ethylene-propylene rubber, ethylene-propylene-diene rubber, unsaturated silicone rubber, or a combination comprising at least one of the foregoing.

5. The rubber composition of claim 1, wherein the functionalized elastomer has a total hydroxy, epoxy, and thio functionalization of 1 to 15 mole percent.

6. The rubber composition of claim 1, wherein the functionalized elastomer is a functionalized poly(styrene-butadiene) rubber having a vinyl content of 10 to 60 mole percent and a styrene content of 5 to 50 mole percent.

7. The rubber composition of claim 1, comprising 10 to 70 wt. % of the functionalized elastomer, based on the total weight of the rubber composition.

8. The rubber composition of claim 1, wherein the reinforcing filler has a surface area of 40 to 400 m$^2$/g.

9. The rubber composition of claim 1, wherein the reinforcing filler comprises silica.

10. The rubber composition of claim 1, comprising the reinforcing filler in an amount of 20 to 120 parts by weight, per 100 parts by weight of the elastomer component.

11. The rubber composition of claim 1, wherein the coupling agent is a polysulfide silane coupling agent comprising a bis(3-ethoxysilylpropyl) polysulfide having 2 to 4 sulfur atoms forming a polysulfide bridge.

12. The rubber composition of claim 1, comprising 5 to 10 wt. % of the coupling agent, based on the total weight of the reinforcing filler.

13. An article comprising the rubber composition of claim 1.

14. The article of claim 13, wherein the article is a component of a tire.

* * * * *